United States Patent
Goldstein et al.

(10) Patent No.: US 8,018,328 B2
(45) Date of Patent: Sep. 13, 2011

(54) ADAPTIVE AUDIO CONTENT GENERATION SYSTEM

(75) Inventors: Steven Goldstein, Delray Beach, FL (US); John Usher, Montreal (CA)

(73) Assignee: Personics Holdings Inc., Boca Raton, FL (US)

(*) Notice: Subject to any disclaimer, the term of this patent is extended or adjusted under 35 U.S.C. 154(b) by 210 days.

(21) Appl. No.: 12/208,923

(22) Filed: Sep. 11, 2008

(65) Prior Publication Data

US 2009/0146799 A1 Jun. 11, 2009

Related U.S. Application Data

(60) Provisional application No. 60/971,652, filed on Sep. 12, 2007.

(51) Int. Cl.
*G08B 3/00* (2006.01)
*B60Q 1/22* (2006.01)
*H03G 3/20* (2006.01)

(52) U.S. Cl. ........... 340/384.1; 340/474; 340/463; 340/441; 340/466; 340/692; 381/56; 381/57; 381/86

(58) Field of Classification Search ........ 340/384.1, 340/474; 381/57
See application file for complete search history.

(56) References Cited

U.S. PATENT DOCUMENTS

| | | | | |
|---|---|---|---|---|
| 4,603,317 A * | 7/1986 | Gailbreath et al. | ........... | 340/463 |
| 5,635,903 A * | 6/1997 | Koike et al. | ........... | 340/441 |
| 6,175,633 B1 * | 1/2001 | Morrill et al. | ........... | 381/71.6 |
| 6,360,187 B1 * | 3/2002 | Hermann | ........... | 702/191 |
| 6,736,444 B2 * | 5/2004 | Reinsch | ........... | 296/107.17 |
| 6,885,295 B2 | 4/2005 | Hanson-Abbott | | |
| 7,388,479 B2 * | 6/2008 | Lee | ........... | 340/463 |

* cited by examiner

*Primary Examiner* — Donnie Crosland
(74) *Attorney, Agent, or Firm* — RatnerPrestia

(57) ABSTRACT

Methods and systems are provided which generate an alarm signal that alerts individuals who may be in the vicinity of a reversing vehicle and that alerts a vehicle operator when the alarm signal is not audible due to high ambient sound levels or detritus covering the alarm transducer. A background noise level in proximity to the vehicle is monitored. A level of the alarm signal is increased as the ambient (or background) sound level rises. Conversely, the level of the alarm signal is reduced as the background noise level decreases. The alarm signal is changed in volume, frequency, or both based on a velocity of the vehicle. A frequency content of the alarm signal may be modified if a spectral profile of an ambient sound field contains spectral components that may mask the alarm signal.

26 Claims, 10 Drawing Sheets

ADAPTIVE AUDIO CONTENT GENERATION SYSTEM

CROSS REFERENCE TO RELATED APPLICATIONS

This Application is a Non-Provisional and claims the priority benefit of Provisional Application No. 60/971,652 filed on Sep. 12, 2007, the entire disclosure of which is incorporated herein by reference.

FIELD

The present invention relates to a method of controlling an audio content generator, and more particularly, though not exclusively, a back-up (reversing) alarm for a vehicle, and a method of modifying the sound of the back-up alarm depending on the velocity of the vehicle and the ambient sound level.

BACKGROUND

It is known that the spectrum of pure-tone back-up alarms is not optimal for providing sound cues which aid perceptual localization in terms of the time taken to localize the sound source (e.g. the reversing vehicle). Pure-tone here means that the fundamental frequency (or pitch) of the alarm signal has a high level compared with other frequency components, and also (generally) that the spectral profile of the alarm signal has a strong harmonic content, with harmonics being related to the fundamental by integer multiples.

Localization of pure-tone alarm signals where the fundamental frequency is above approximately 2 kHz is less accurate than for pure-tone signals with lower fundamental frequencies because the phase-locking of hair-cells in the human cochlea is reduced above this frequency, and also because interaural sound cues based on interaural phase are ambiguous above that frequency with a half wave-length equal to the interaural distance. Furthermore, pure tone frequencies may not be heard due to absorption from plants and other objects, and may also be confused with other audible alarm cues. A third reason why pure-tone alarm signals are not optimal for safety is because of hearing loss factors which workers may suffer (especially in work environments where such back-up system are used, such as mining operations or other industrial work places).

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS

Figure 1:
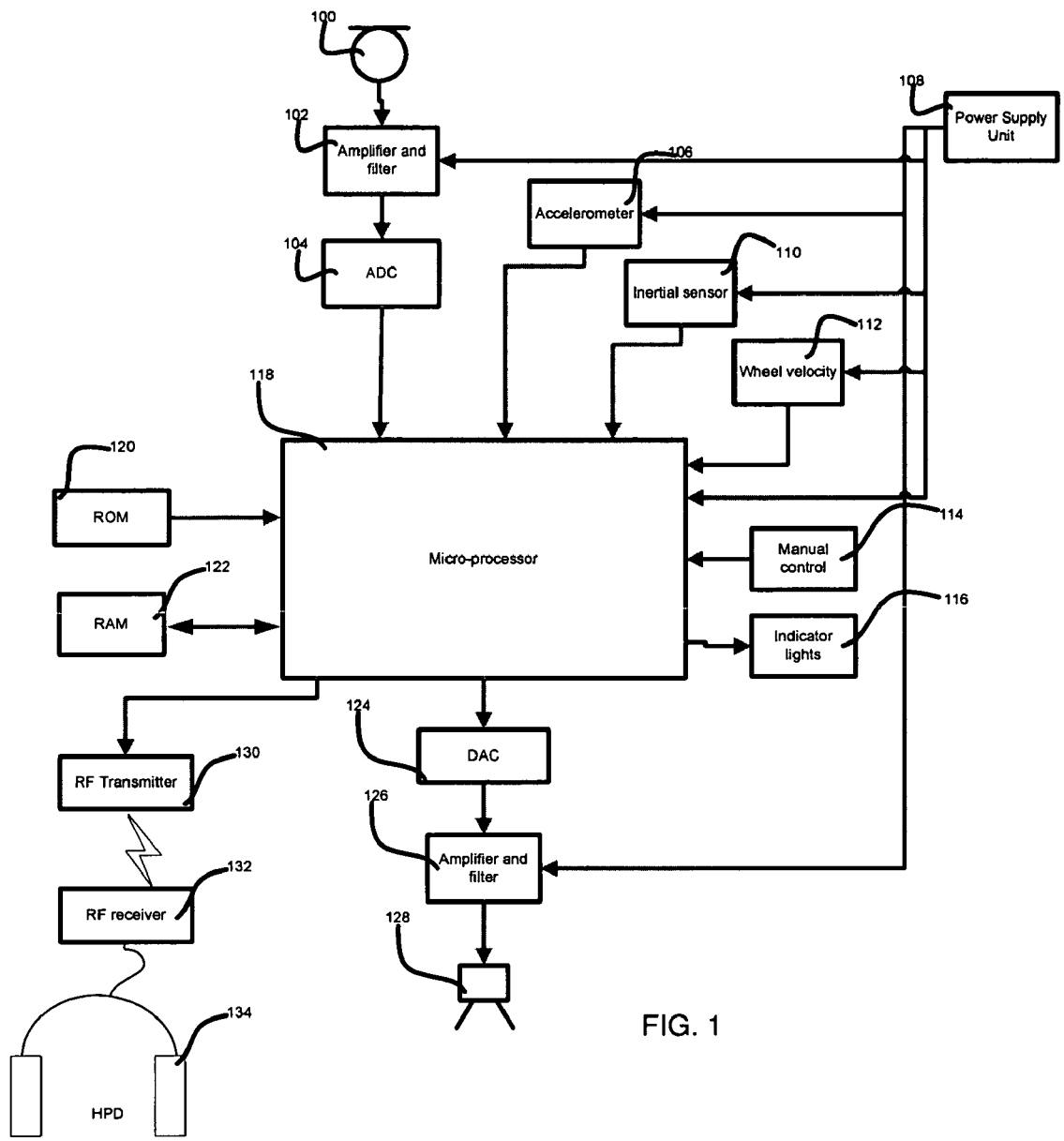
FIG. 1 illustrates an adaptive backup alarm system (ABAS) in accordance with at least one exemplary embodiment.

The following description of exemplary embodiment(s) is merely illustrative in nature and is in no way intended to limit the invention, its application, or uses.

Exemplary embodiments are directed to or can be operatively used on various wired or wireless earpieces devices (e.g., earbuds, headphones, ear terminal, behind the ear devices or other acoustic devices as known by one of ordinary skill, and equivalents).

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally exemplary embodiments are not limited to earpieces, for example some functionality can be implemented on other systems with speakers and/or microphones for example computer systems, PDAs, BlackBerry® smartphones, cell and mobile phones, and any other device that emits or measures acoustic energy. Additionally, exemplary embodiments can be used with digital and non-digital acoustic systems. Additionally various receivers and microphones can be used, for example MEMs transducers, diaphragm transducers, or other known transducers.

Notice that similar reference numerals and letters refer to similar items in the following figures, and thus once an item is defined in one figure, it may not be discussed or further defined in the following figures.

Examples of exemplary embodiments discussed herein explore hardware configurations for the Adaptive Backup Alarm System (ABAS) describing the arrangement of various digital and analog signal processing units, as well as sound sensors and sound generators. At least one exemplary embodiment of the present invention uses a digital microprocessor 118, but can also be implemented using an analog electronic signal processing method.

FIG. 1 illustrates an adaptive backup alarm system (ABAS) in accordance with at least one exemplary embodiment. In at least one exemplary embodiment, a sound sensor 100 is a microphone, such as a moving coil or miniature microphone (e.g., MEMS type), detects an acoustic signal (microphone signal). The microphone signal is processed by unit 102 which amplifies the signal on a frequency selective basis (e.g., A-weighting). In at least one exemplary embodiment, the analog filter in unit 102 is a band-pass filter, whereby low-frequencies (e.g. below 50 Hz) are removed (e.g., completely removed) from the microphone signal, for example to reduce the saturation of the microphone signal from low-frequency rumble from the vehicle.

In at least one exemplary embodiment, multiple sound sensors can be used, which can be mounted on the same vehicle as the ABAS, or may be mounted remotely in other vehicles or personnel in the vicinity of the vehicle, and the remote sound sensing signal communicated to the ABAS with a wireless means such as analog or digitally encoded radio.

The amplified and filtered microphone signal can be sampled and converted into a digital representation with Analog-to-Digital Converter (ADC) 104. In at least one exemplary embodiment, the ADC 104 has a sample rate of approximately 20 kHz, with 16 bit sample resolution.

Accelerometer unit 106 and inertial sensor system 110 detect motion of the vehicle. In at least one exemplary embodiment, these units are in the same assembly that houses all components of the Adaptive Backup Alarm System (ABAS) illustrated in FIG. 1 (with the exception of the wheel velocity sensor 112). The accelerometer unit 106 and inertial sensor 110 can be used together or separately to determine the velocity of the vehicle in the forward/back direction. The velocity can be calculated directly, or from the integration of the acceleration, assuming an initial velocity at the beginning of acceleration sampling is known.

For example the general equation $v_f - v_0 = \alpha \Delta t$ provides a simplified method (assuming translational motion for this example) of using the measured acceleration "$\alpha$"; during the sample time $\Delta t$; having a sample time beginning velocity of $V_0$, to calculate the final velocity $V_f$. If the translation is desired one can calculate the translation, for example using the general equation (assuming translation) $2\alpha\Delta x = (v_f^2 - v_0^2)$ that provides a simplified method of using the acceleration "$\alpha$", initial velocity "$V_o$", and final velocity "$V_f$" to obtain a distance traveled "$\Delta x$." Additionally measurement errors can be taken into account via various filtering techniques, for example Kalman Filtering.

Alternatively, the vehicle velocity may be calculated by other methods such as using a Global Positioning system (e.g., differencing two GPS calculated positions and dividing by the sample time), or by monitoring the rate of rotation of a vehicle wheel or a wheel axle using unit 112.

RAM 122 and ROM 120 are computer readable memory that is used to store program code and data relating to ABAS, for example a backup alarm signal.

A digital signal from a microprocessor 118 is converted to the analog domain using Digital to Analog Converter (DAC) unit 124, which in at least one exemplary embodiment has the same sample rate as the ADC unit 104. The analog signal is then amplified and filtered using unit 126. The signal from unit 126 drives sound creating device 128. In at least one exemplary embodiment, sound creating device 128 is a conventional electro-dynamic loudspeaker. One or more components of the system shown in FIG. 1 may be powered by a power supply unit 108. The back-up alarm signal may be indicated visually, such as by indicator lights 116. Microprocessor 118 may also receive a signal from a manual control unit 114.

In at least one exemplary embodiment, more than one sound creating device can be used, which can be mounted on the vehicle to which the ABAS is attached.

In at least one further exemplary embodiment, a sound creating device to emit (e.g., radiate) the back-up alarm signal can be mounted remotely, e.g. on other individuals, or can be transmitted wirelessly using RF transmitter 130 and auditioned by other people using headphones or hearing protection devices (HPDs) 134 via RF receiving unit 132.

Figure 2:
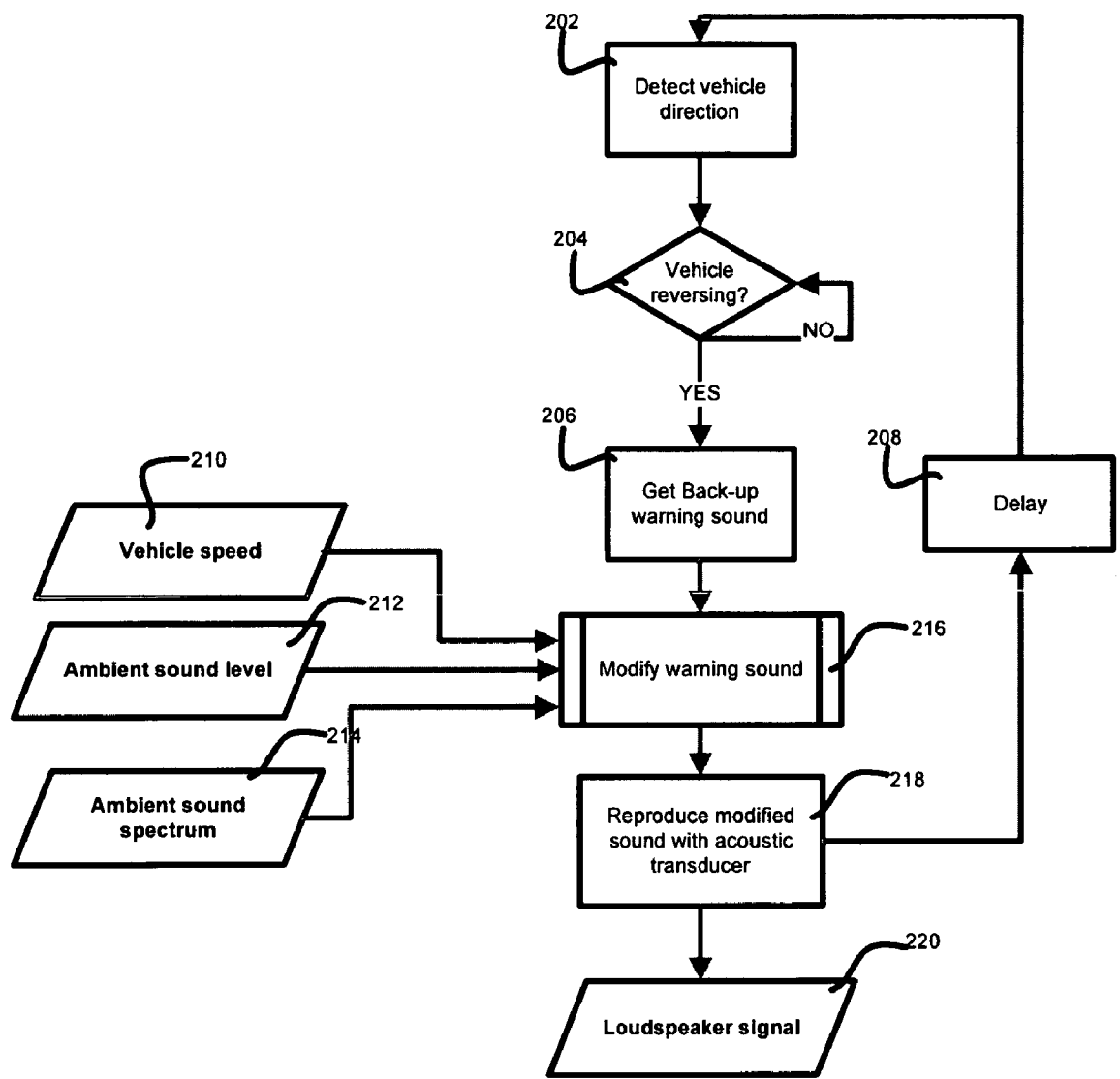
FIG. 2 illustrates a flow-chart for an Adaptive Backup Alarm System (ABAS) in accordance with an exemplary embodiment.

FIG. 2 illustrates a flow-chart for an Adaptive Backup Alarm System (ABAS) in accordance with an exemplary embodiment. The ABAS is mounted on a vehicle and the direction of the vehicle is detected using unit 202. An example of such a detection unit is a multi-dimensional accelerometer, where the axis of maximum sensitivity is aligned with the front/back direction of the vehicle. For example, by measuring the acceleration in the plane of the vehicle, e.g., $a_x$ and $a_y$, and knowing the initial velocity vector one can constantly compute a new velocity vector, providing the general direction of travel of the vehicle. If decision unit 204 determines from accelerometer and inertial measurement systems that the vehicle direction is "back" (i.e. the vehicle is reversing), then a number of (e.g., single) "beep(s)" of the backup alarm sound can be selected by unit 206. This number of "beep(s)" is typically a short sound (e.g. 0.4 seconds) with a strong harmonic content, as shown by the exemplary spectral analysis in FIG. 9.

In at least one exemplary embodiment, the number of beep(s) is modified by unit 216 which generates a modified beep signal. The modification of the beep comprises gain and spectral processing to change the frequency spectrum of the alarm signal. The modification unit 216 can include information from at least one of the following:

a vehicle speed unit 210 for reporting the speed of the vehicle (e.g. in miles per hour);

an ambient sound level unit 212 for reporting the sound pressure level (SPL) in dB in the immediate vicinity of the vehicle; and an ambient sound spectrum unit 214 for reporting the spectral profile of the ambient sound field, such as by recording the ambient sound microphone 100 signal into a digital buffer, and calculating the spectrum via a Fast Fourier Transform, as is familiar to those skilled in the art.

The modified beep signal is then reproduced with an acoustic transducer via unit 218 to emit a loudspeaker signal 220, such as with a loudspeaker 128 mounted on the ABAS.

After a delay determined by delay unit 208 (for example about 0.4 seconds), the process is repeated again to generate a new alarm signal beep.

Figure 3:
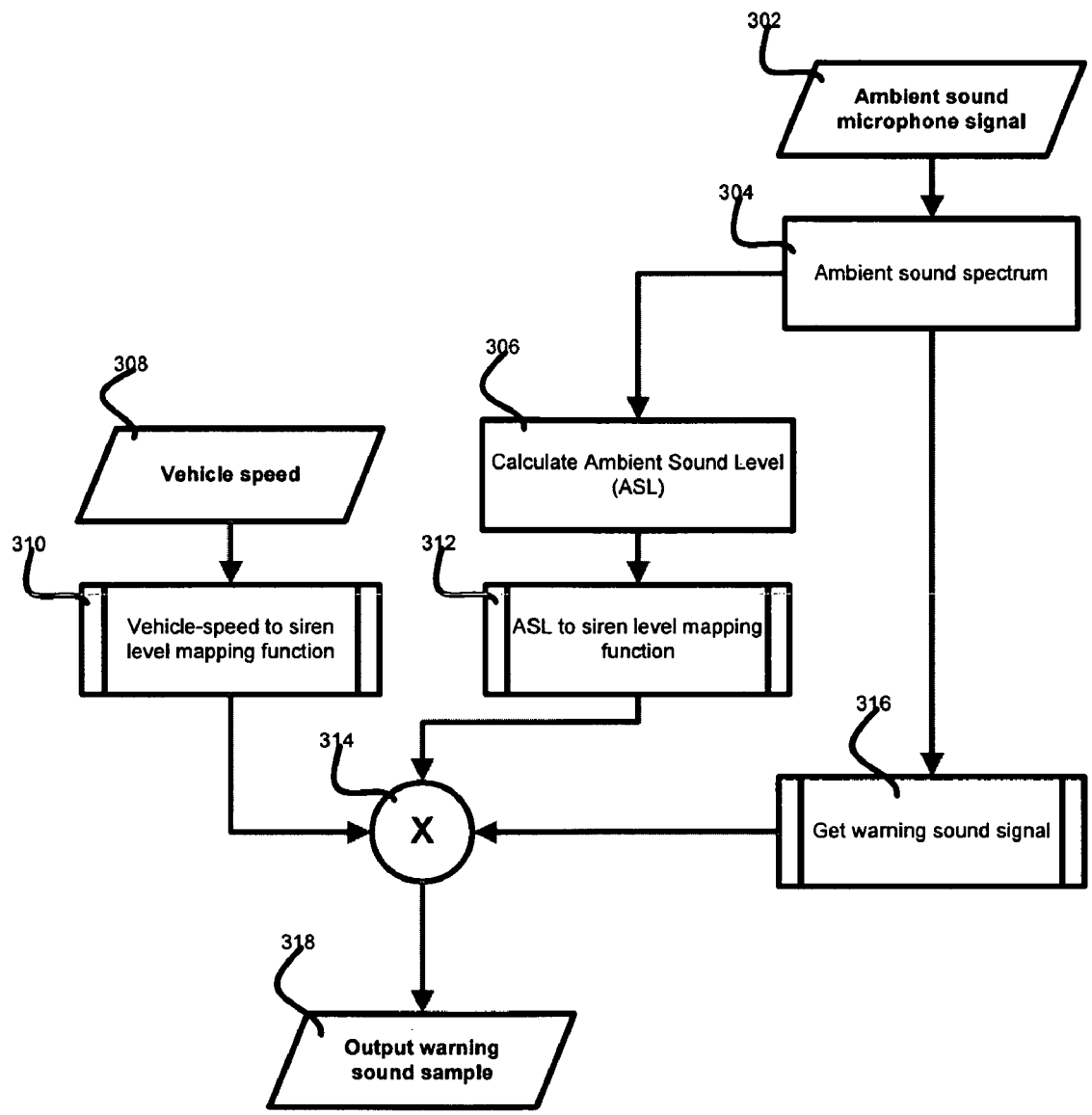
FIG. 3 is a block diagram illustrating alarm signal modification in accordance with an exemplary embodiment.

FIG. 3 is a block diagram illustrating alarm signal modification in accordance with an exemplary embodiment. The block diagram is related to modification unit 216 of FIG. 2 that changes or modifies the alarm signal. In at least one exemplary embodiment, the alarm signal beep is modified as a function of vehicle speed, the background noise level, and the ambient sound frequency spectrum.

The vehicle speed 308 is provided to a mapping function 310 that maps a vehicle speed to an alarm signal gain. Mapping function 310 outputs the alarm signal gain (for a vehicle speed) to a multiplier 314. Mapping function 310 comprises a look-up table for associating vehicle speeds to alarm signal gain. An example of look-up table has vehicle speeds between 0.1 and 5 mph having an alarm signal gain of 2, vehicle speeds between 5 and 15 mph have an alarm signal gain of 4 and for vehicle speeds greater than 15 mph the alarm signal gain is 8. Increasing the loudness of the alarm signal with speed provides earlier recognition to people in proximity to take notice of the vehicle.

Alternately, an algorithmic approach is used that relates vehicle speed to alarm signal gain. For example, equation (1) relates vehicle speed to alarm signal gain.

$$\text{Alarm\_signal\_gain} = \text{vehicle\_speed [mph]} * 0.2 \quad (1)$$

A second path provides a second alarm signal gain to multiplier 314. The second path uses background noise level as a modifier of the alarm signal gain. In general, the alarm signal should increase in loudness as the background noise level increases to ensure that it can be heard by those in proximity to the vehicle. In at least one exemplary embodiment, the microphone provides an ambient sound microphone signal 302. The microphone receives sound in proximity to the vehicle when the alarm signal is not being output by the loudspeaker. In at least one exemplary embodiment, ambient sound microphone signal 302 is converted to an ambient sound spectrum in a step 304. An FFT or other means as is known in the art is used to convert the signal to the frequency domain. In a step 306, the background noise level is calculated from the provided ambient sound spectrum. The calculation of background noise level is shown in more detail in FIG. 7. A mapping function 312 maps background noise level to alarm signal gain. Background noise level to signal alarm gain is mapped similar to the vehicle speed to alarm signal gain previously described hereinabove. Note that in at least one exemplary embodiment the net signal gain can be checked with respect to a threshold value (e.g., 100 dB) and reset to the threshold value if exceeded as will be disclosed in more detail hereinbelow.

A third path reviews the alarm signal as received by the microphone from the loudspeaker. The ambient sound microphone signal 302 is converted to an ambient sound spectrum in the step 304. The alarm signal measured spectral content or sound pressure level can be used as input for modification of the alarm signal prior to step 316. The modified or unmodified alarm signal is provided to the multiplier 314 in a step 316. Multiplier 314 adjusts the gain of the next alarm signal based on the multipliers related to velocity and background noise level and increases or decreases the level of the alarm sound signal. The modified alarm signal is provided to the loudspeaker to be reproduced in a step 318.

Figure 4:
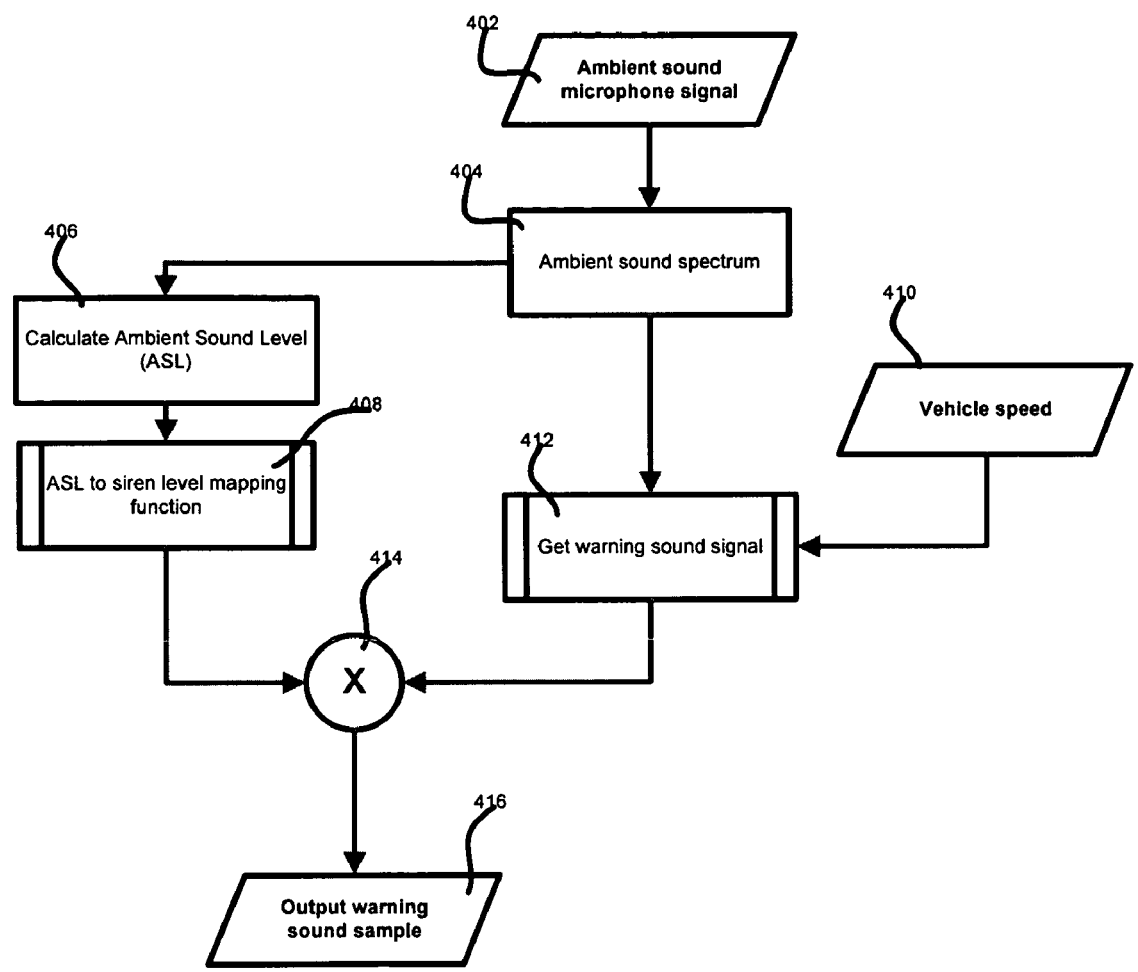
FIG. 4 is a block diagram illustrating alarm signal modification by increasing harmonic content of the alarm signal in accordance with an exemplary embodiment.

FIG. 4 is a block diagram illustrating alarm signal modification by increasing harmonic content of the alarm signal in accordance with an exemplary embodiment. In at least one exemplary embodiment, the sound of the alarm signal is adjusted based on different vehicle speeds. The change in sound alerts people in proximity to the vehicle that it is accelerating thereby increasing their awareness of the situation.

A microphone receives sound in proximity to the vehicle. The microphone provides an ambient sound microphone signal 402. The ambient sound microphone signal 402 is converted to an ambient sound spectrum in a step 404. The conversion from time domain to frequency domain is accomplished via a FFT or other means known by one skilled in the art.

In a first path, an ambient sound spectrum is received that does not contain an alarm signal. The background noise level in proximity to the vehicle is then calculated in a step 406 from the ambient sound spectrum. The calculated background noise level is provided to a mapping function 408. The mapping function provides an alarm signal gain corresponding to the background noise level. For example, the alarm signal gain increases corresponding to an increase in background noise level to ensure the signal is heard. Conversely, alarm signal gain is decreased by mapping function 408 when the background noise level is reduced. As disclosed hereinabove, mapping function 408 provides a look-up table that maps measured background noise level to an alarm signal gain. Alternately, an algorithmic approach could be used to calculate an amplifier gain adjustment versus background noise level. The mapped alarm signal gain is provided to multiplier 414. This gain adjustment keeps the alarm signal in a loudness range where people will be aware of the vehicle even with high background noise levels.

Figure 9:
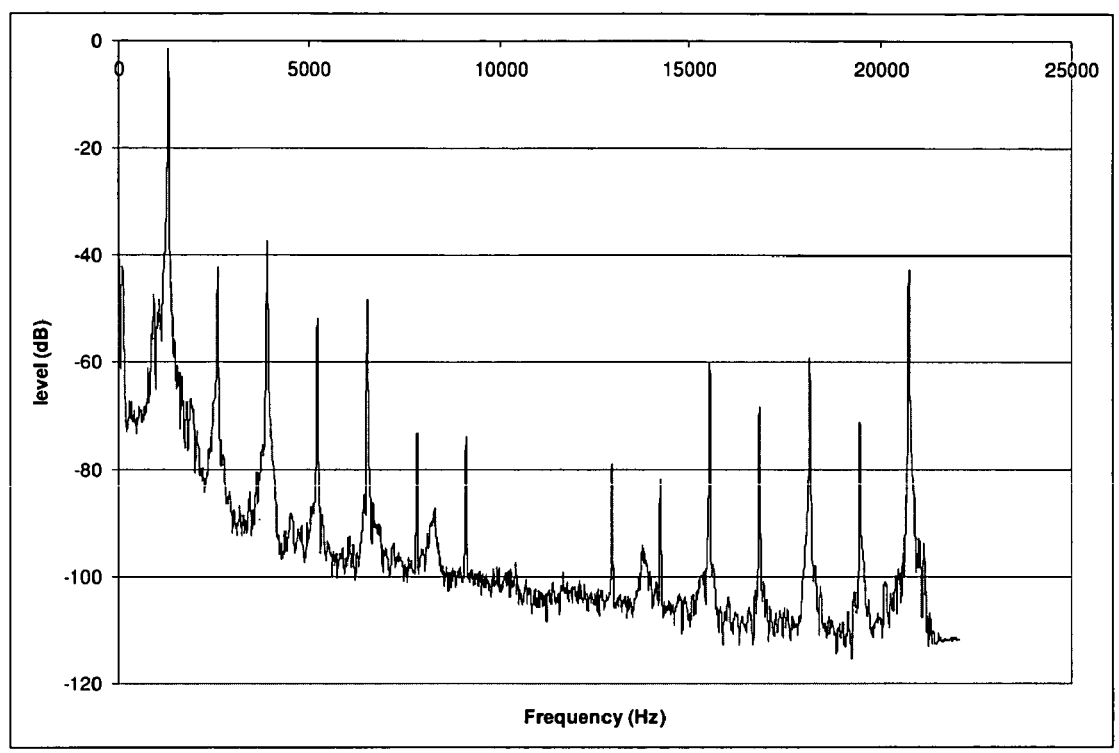
FIG. 9 is a spectral diagram of an alarm signal in accordance with an exemplary embodiment.

A second path reviews the alarm signal as received by the microphone from the loudspeaker. The ambient sound microphone signal 402 is converted to an ambient sound spectrum in the step 404. The alarm signal measured spectral content or sound pressure level can be used as input for modification of the alarm signal in a step 412. A vehicle speed 410 is provided as input to modifying the alarm signal. In at least one exemplary embodiment, the harmonics of the alarm signal are modified as vehicle speed changes to make people aware that the vehicle is accelerating or decelerating. FIG. 9 illustrates that an alarm signal has multiple harmonic components. The harmonics of the alarm signal could be increased or decreased in amplitude to change the sound. For example, the harmonics are increased in amplitude from the lowest frequency harmonic to the highest frequency harmonic with increasing speed (or over a predetermined speed range). People would hear the change in high frequency content in the alarm signal and associate the change with increasing speed. Alternately, the alarm signal can contain more harmonics (e.g. obtained by distorting the original signal with increasing speed. Thus, an automatic awareness of changing velocity is achieved by modifying the alarm signal. The vehicle speed and ambient sound spectrum input is provided for modifying the alarm signal. A modified or unmodified alarm signal is provided to the multiplier 414 in the step 412. Multiplier 414 adjusts the gain of the next alarm signal and increases or decreases the level of the alarm sound signal. The modified (both frequency content and volume) alarm signal is provided to the loudspeaker to be reproduced in a step 416.

Figure 5:
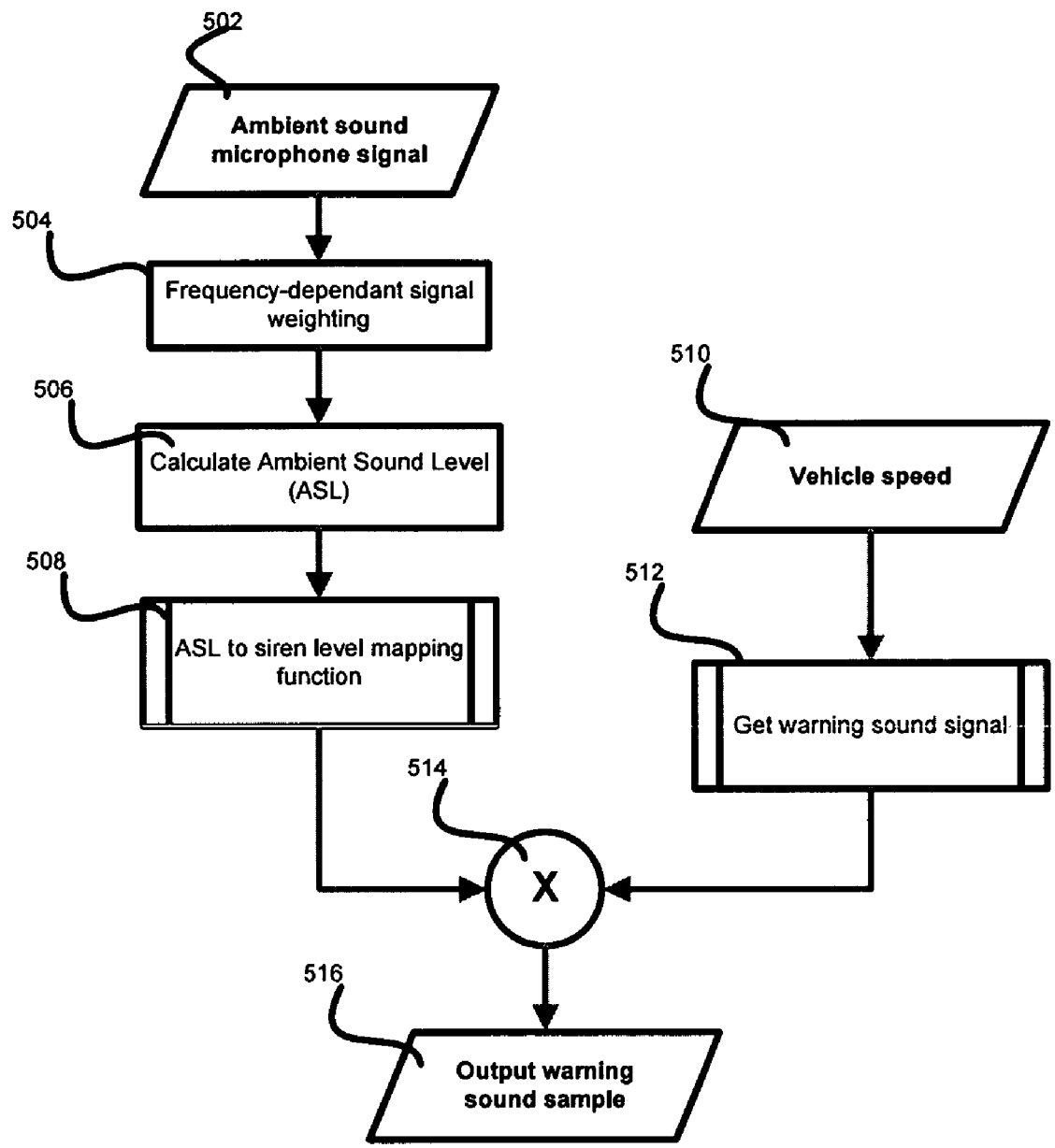
FIG. 5 is a block diagram illustrating alarm signal modification in which the background noise level estimation is based on a frequency-weighted average in accordance with an exemplary embodiment.

FIG. 5 is a block diagram illustrating alarm signal modification in which the background noise level estimation is based on a frequency-weighted average in accordance with an exemplary embodiment. In a first path, an ambient sound spectrum is received that does not contain an alarm signal. In at least one exemplary embodiment, the ambient sound microphone signal 502 is converted to a frequency dependant weighted signal in a step 504. The background noise level in proximity to the vehicle is then calculated from the frequency dependant weighted signal in a step 506. The calculated background noise level is provided to a mapping function 508. The mapping function provides an alarm signal gain corresponding to the background noise level. For example, the alarm signal gain increases corresponding to an increase in background noise level to ensure the signal is heard. Conversely, alarm signal gain is decreased by mapping function 508 when the background noise level is reduced. As disclosed hereinabove, mapping function 508 provides a look-up table that maps measured background noise level to an alarm signal gain. Alternately, an algorithmic approach could be used to calculate an amplifier gain adjustment versus background noise level. The mapped alarm signal gain is provided to multiplier 514. The vehicle speed is obtained in step 510 and is used to select or generate the warning sound signal 512. The warning sound signal can be a selection of different signals, with each signal being selected depending on the vehicle speed (e.g. a signal with a lower frequency and less urgent-sounding timbre for slow vehicle speeds, and a signal with a higher frequency and more urgent-sounding timbre for faster vehicle speeds). Multiplier 514 adjusts the gain of the alarm signal and increases or decreases the level of the alarm sound signal. The modified alarm signal is provided to the loudspeaker to be reproduced in a step 516.

Figure 6:
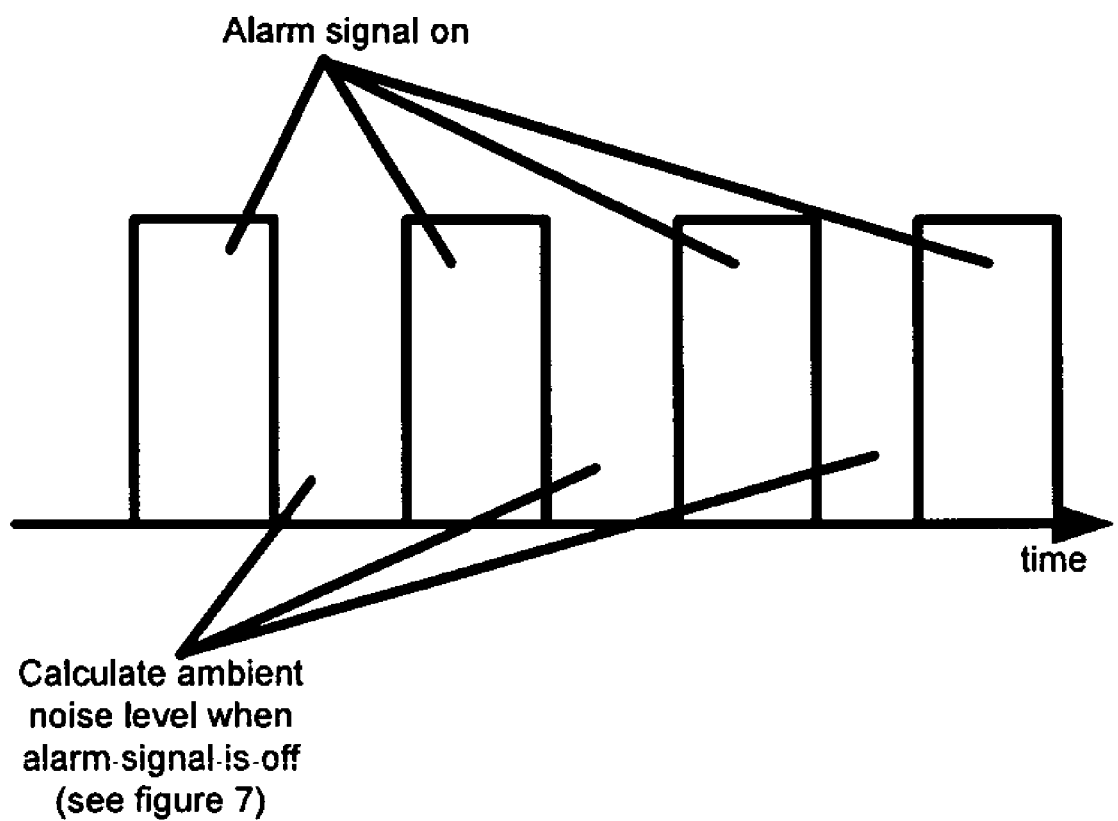
FIG. 6 illustrates a method of determining when an ambient sound level is calculated in accordance with an exemplary embodiment.

FIG. 6 illustrates a method in accordance with at least one exemplary embodiment when ambient sound level is calculated. In at least one exemplary embodiment, the alarm signal "beep" is approximately 0.4 seconds long, and the "off" time (i.e. time between one beep stopping and the next beep starting) is also approximately 0.4 seconds. Referring to FIG. 9, and in at least one exemplary embodiment, the frequency spectrum of an alarm signal beep is shown. Referring to FIG. 6, the ambient sound level is calculated when the alarm signal is "off." Where "off" can refer to a set time value added to a time associated with a dB value below a threshold value. For example, a 5 dB value from a decreasing variation from a base line fit (a line fit to the general curve) where variations are generated from the baseline and replotted to determine a modified ambient sound level variation value, and where if the variation level is larger than and drops below 5 dB, the time associate with this occurrence is added to another time value to get the beginning of the "off" period. This ensures that the background sound level is being measured and that the alarm signal has dissipated and is not being picked up in the measurement.

Figure 7:
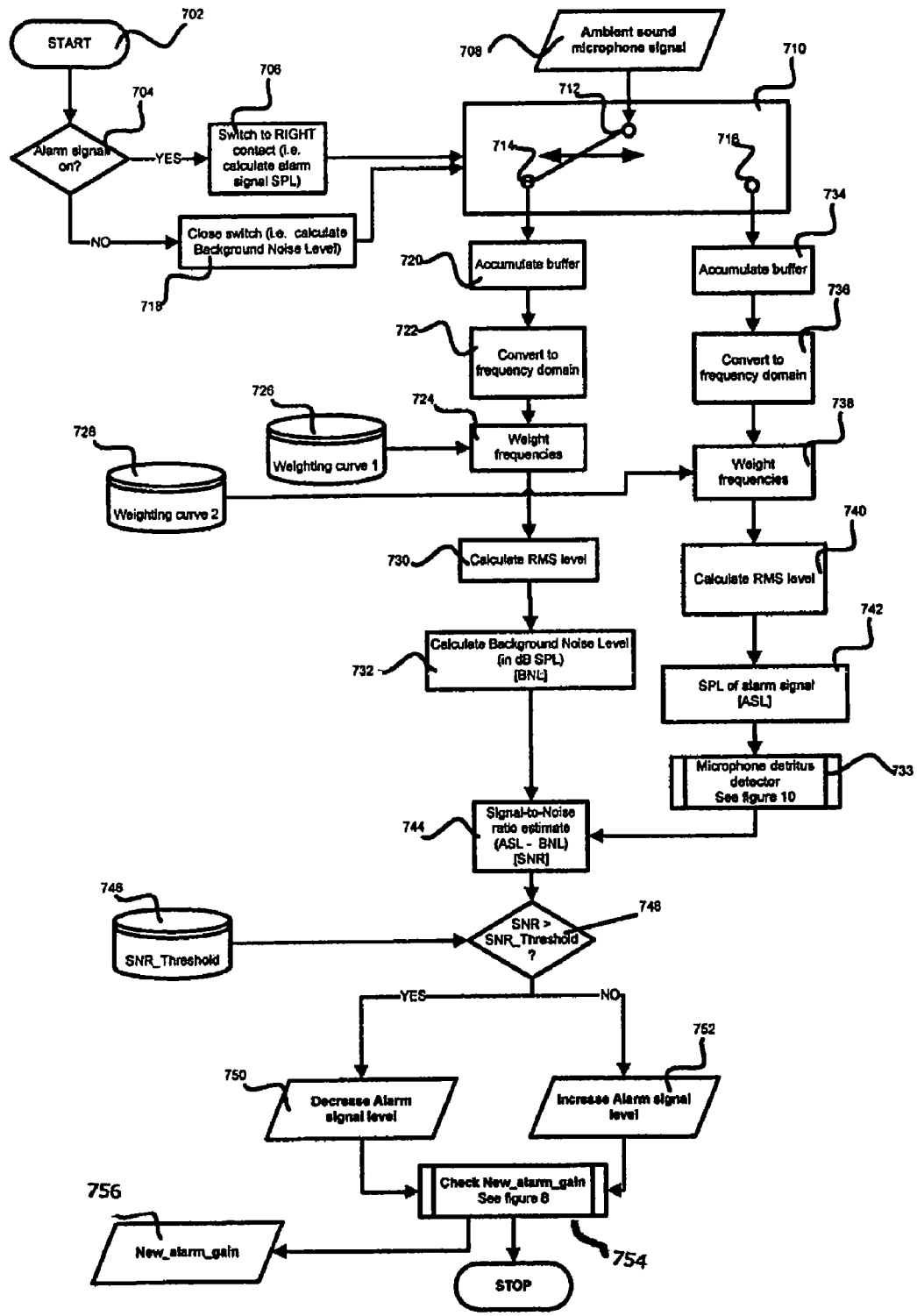
FIG. 7 is a block diagram illustrating a method of adapting an alarm signal in accordance with an exemplary embodiment.

FIG. 7 is a block diagram illustrating a method of adapting an alarm signal in accordance with an exemplary embodiment. The method is started at step 702. At step 704, it is determined whether the alarm signal is on. In general, the method includes calculating the Background Noise Level (BNL), the level of the alarm signal, updating the level of the alarm signal according to the relative level of the BNL and the alarm level (equivalent to a signal-to-noise ratio estimate) thereby ensuring that the alarm signal is heard over the ambient. In at least one exemplary embodiment, the BNL and the alarm signal level are measured by an ambient sound microphone.

A relay switch 710 has two positions, a first position 706 is enabled when the alarm signal is on. Relay switch 710 is connected between node 712 and node 716 connecting the ambient sound microphone signal 708 to accumulate buffer 734. A second position 718 is enabled when the alarm signal is off. In general, when a vehicle is backing up the alarm signal is typically periodic with the repeating pattern of the alarm sound followed by a period of silence.

In the first position, relay switch 710 directs the digitized signal 708 from an ambient sound microphone (ASM) to a digital buffer 734 when the backup alarm signal is reproduced with a loudspeaker. Digital buffer 734 stores the signal. In at least one exemplary embodiment, the signal or part of the signal stored in buffer 734 is converted to the frequency domain in a step 736. The frequency-domain transform is weighted with a frequency dependant weighting vector 728 to give a frequency weighted signal in a step 738. The RMS level of the frequency weighted signal is calculated in a step 740 (or alternatively, mean-square or sum of squares). The sound pressure level of the alarm signal is then calculated in a step 742 and provided in a dB signal level to give the Alarm Signal Level (ASL) (in dB). The accuracy of the measurement is checked in a step 733 to ensure that the system is performing correctly. In particular, the system is checked to determine if the sound pressure level measured is close to the expected sound level. If the system is functioning correctly, the measured sound pressure level is provided for generating a Signal to Noise ratio estimate in a step 744.

Switch 710 in the second position 718 measures the background noise level using the ambient sound microphone. The alarm signal is not reproduced by the loudspeaker of the vehicle during this measurement (i.e. during the "off" part of the alarm signal duty cycle). Thus, the ambient sound microphone receives sounds in proximity to the vehicle. The digitized signal 708 from the ambient sound microphone (ASM) is provided (via node 714 of switch 710) to a digital buffer 720. In at least one exemplary embodiment, the signal 708 or a portion of signal 708 stored in buffer 720 is converted to the frequency domain in a step 722. A frequency dependent weighting vector 726 is applied to the frequency-domain transform to generate a frequency-weighted signal in a step 724. The RMS level of the frequency weighted signal is calculated in a step 730 (or alternatively, mean-square or sum of squares). The sound pressure level of the background noise level is then calculated in a step 732 and provided in a dB signal level to give the Background Noise Level (BNL in dB).

A Signal to Noise ratio (SNR) estimate is generated in a step 744. The estimate is calculated by subtracting the the BNL from the the ASL. This calculation represents the loudness of the alarm signal in relation to the background noise level. In a step 748, the SNR is compared to SNR_threshold value 746 and will adjust the sound pressure level of the alarm signal to be approximately equal to the SNR_threshold value 746. For example, a SNR_threshold value of 20 dB adjusts the alarm signal to be approximately 20 dB above the background noise level ensuring that people hear the alarm in proximity to the vehicle.

In at least one exemplary embodiment, the alarm signal level is increased in a step 752 if the measured SNR is less than the SNR_threshold (e.g. measured SNR is 18 dB). The alarm signal level is increased by the difference between SNR and SNR_threshold (e.g. 2 dB) whereby the alarm signal is louder to those in proximity to the vehicle when the next alarm signal is output by the loudspeaker. In at least one exemplary embodiment, the alarm signal is checked in a step 754 (Check New_alarm_gain) to determine if the level of the alarm signal can be safely heard by people in proximity to the vehicle. The new_alarm_gain is further adjusted in a step 756 that reduces the alarm signal level to a safe level that will not harm those in proximity to the vehicle if the step 754 determines that the alarm signal is out of a safety zone. The alarm signal gain is increased by the difference between SNR and SNR_threshold (e.g. 2 dB) if it is determined that the alarm signal can be safely heard in step 754.

In at least one exemplary embodiment, the alarm signal level is decreased in a step 750 if the measured SNR is greater than the SNR_threshold (e.g. measured SNR is 23 dB). The alarm signal level is decreased by the difference between SNR and SNR_threshold (e.g. 3 dB) whereby the alarm signal is reduced in loudness to those in proximity to the vehicle when the next alarm signal is output by the loudspeaker. In at least one exemplary embodiment, the alarm signal is checked in a step 754 (check New_alarm_gain) to determine if the level of the alarm signal can be safely heard by people in proximity to the vehicle. The new_alarm_gain is further adjusted by providing in a step 756 that reduces the alarm signal level to a safe level that will not harm those in proximity to the vehicle if the step 754 determines that the alarm signal is out of a safety zone. The new gain of the alarm signal is called the Modified Alarm Signal Level (M_ASL). The alarm signal gain is decreased by the difference between SNR and SNR_threshold (e.g. 3 dB) if it is determined that the alarm signal can be safely heard in a step 754.

Figure 8:
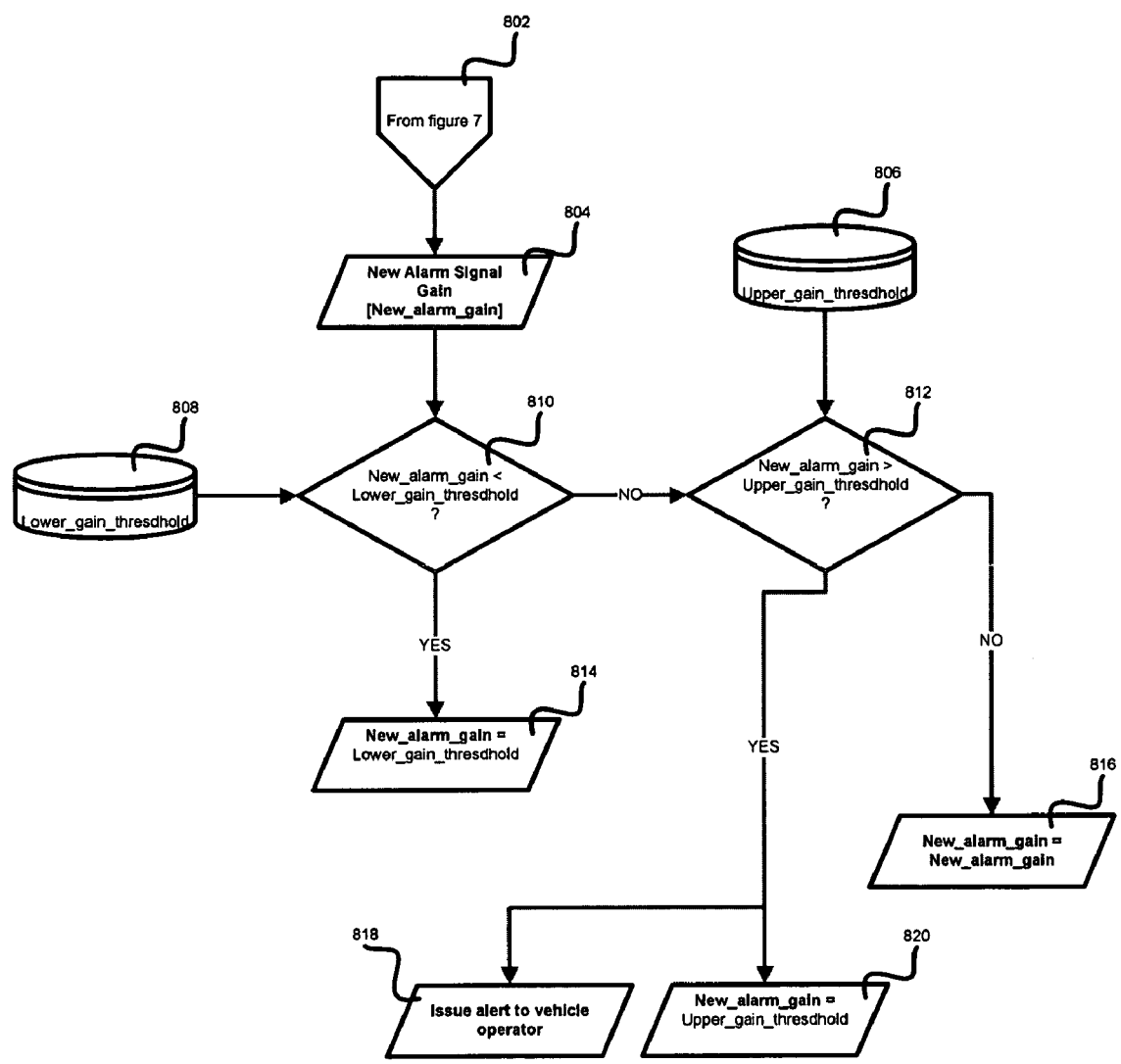
FIG. 8 is a block diagram illustrating a method of adapting an alarm signal in accordance with an exemplary embodiment.

FIG. 8 is a block diagram illustrating a method of adapting an alarm signal in accordance with an exemplary embodiment. The block diagram illustrates further detail of the step 754 (Check New_alarm_gain) on how the M_ASL is checked to ensure that if the ambient sound level is too high for the backup alarm signal to be safely heard by individuals in the vicinity if the ABAS, the vehicle operator is made aware of this using a visual or auditory warning system. Once made aware of this condition, the vehicle operator drives with more care or in some exemplary embodiments, the vehicle may be disabled from reversing until the background noise level is sufficiently low thereby protecting people in proximity to the vehicle who may not hear the alarm signal.

The new_alarm_gain 804 is provided in a step 802 for comparison to a lower_gain_threshold 808. As mentioned hereinabove, new_alarm_gain is based on the measurements of the alarm signal and the background noise level using the ambient sound microphone. The new_alarm_gain is compared against a lower_gain_threshold 808 in a step 810. In at least one exemplary embodiment, lower_gain_threshold 808 represents a minimum gain to provide an alarm signal that can be heard and warn people in proximity to the vehicle in a low background noise environment. In other words, the alarm signal has to be of a minimum loudness for people to perceive it as a warning and react to the presence of the sound. The new_alarm_gain is made equal to lower_gain_threshold 808 in a step 814 if new_alarm_gain is less than the lower_gain_threshold 808 thereby assuring the alarm signal will never fall below the predetermined level.

A further comparison occurs if new_alarm_gain is greater than the lower_gain_threshold 808. In a step 812, new_alarm_ gain 812 is compared against an upper_gain_threshold 806. In at least one exemplary embodiment, the upper_gain_threshold 806 corresponds to a maximum safe level of the alarm signal. In a step 816, the new_alarm_gain remains unchanged if the new_alarm_gain is less than the upper_gain_threshold 806. The new_alarm_gain calculated in FIG. 7 is applied to the circuit such that the next alarm signal is provided through the loudspeaker using this value.

In step 812, new_alarm_gain is adjusted when new_alarm_gain is greater than upper_gain_threshold 806. In at least one exemplary embodiment, the new_alarm_gain is made equal to upper_gain_threshold 806 in a step 820. Thus, the maximum alarm signal level output by the loud speaker corresponds to the upper_gain_threshold 808. An alert 818 is provided to the vehicle operator such as an auditory or visual (or combination thereof) warning that the alarm signal may be difficult for people to hear and that they should drive with extra precaution.

FIG. 9 illustrates an example of a spectral signature of a back-up alarm "beep" in accordance with an exemplary embodiment. The spectral signature of the alarm beep includes harmonic content as is shown in the diagram.

Figure 10:
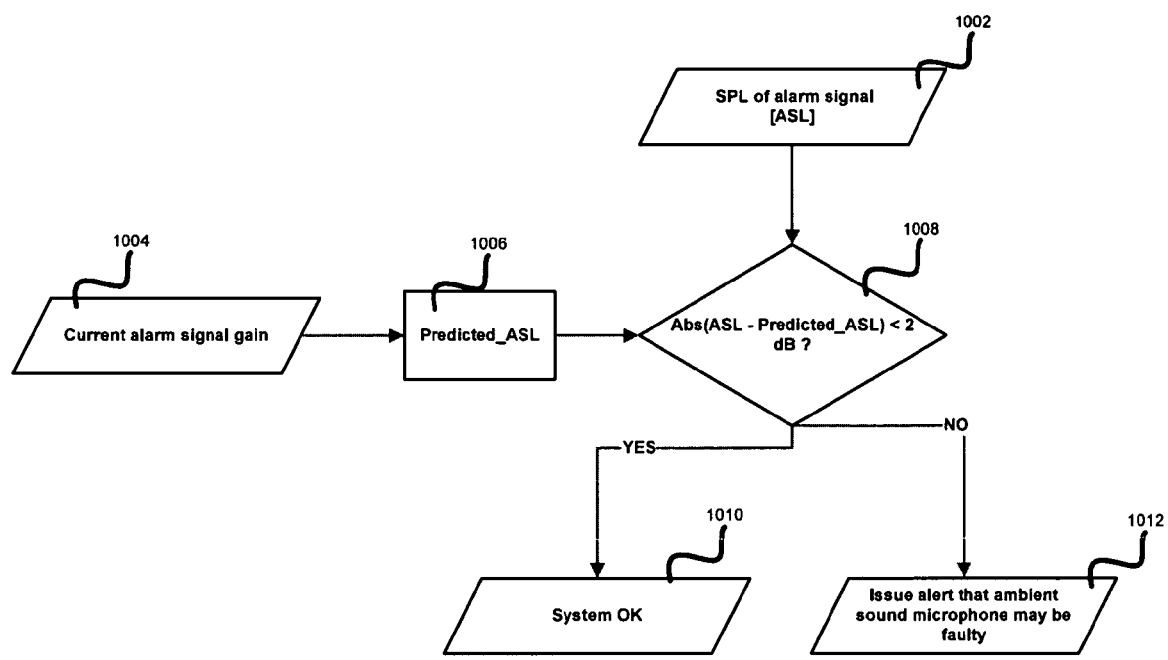
FIG. 10 illustrates a microphone detritus detector system in accordance with an exemplary embodiment.

FIG. 10 illustrates a microphone detritus detector system in accordance with an exemplary embodiment. The ambient sound microphone is positioned to receive sound in proximity to the vehicle. In at least one exemplary embodiment, the ambient sound microphone and loudspeaker are within 10 centimeters of one another. The placement of the ambient sound microphone near the speaker minimizes contributions of the background noise when measuring the alarm signal. The placement exposes the microphone to the external environment and can become occluded or partially occluded by dirt and grime. The test determines if the sound pressure level of the alarm signal is within a predicted range based on the amplification of the signal and the expected output from the loudspeaker. The range is determined by the tolerances and characteristics of the ambient sound microphone, amplifier stage, and loudspeaker.

The level of the alarm signal is measured as disclosed in FIG. 7 and provided in a step 1002. The electrical signal corresponding to the alarm signal and the signal path is known. In at least one exemplary embodiment, the alarm signal gain corresponding to the measured alarm signal is provided in a step 1004. The predicted_ASL (ambient sound level) is calulated on the alarm signal gain and the loudspeaker characteristics is estimated in a step 1006. The predicted_ASL corresponds to a predicted SPL level of the alarm signal. The measured SPL of the alarm signal is compared against the predicted SPL level of the alarm signal in a step 1008. In at least one exemplary embodiment, the system is determined to be functioning correctly in a step 1010 if the difference between the measured SPL and predicted SPL of the alarm signal is within a predetermined range (for example, ±2 dB). The system would be determined to be not functioning correctly if the difference between the measured SPL and the predicted SPL of the alarm signal is outside the predetermined range. An alert is issued in a step 1012 indicating the microphone or system is faulty when outside the range.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 90 degrees) should be interpreted to be "about" the value of the stated number (e.g., about 90 degrees).

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A method of modifying an alarm signal of a vehicle comprising:
   measuring a background noise level of a region in proximity to the vehicle when the alarm signal is not emitted;
   measuring at least one of a velocity or a direction of movement of the vehicle;
   generating the alarm signal to contain information related to the at least one of the velocity or the direction of movement;
   emitting the generated alarm signal;
   measuring an alarm signal level of the emitted alarm signal and the background noise level;
   modifying the generated alarm signal based on the measured background noise level and the alarm signal level; and
   emitting the modified alarm signal.

2. The method according to claim 1, wherein the modifying of the generated alarm signal includes modifying a level of the generated alarm signal based on the measured background noise level.

3. The method according to claim 1 wherein the generating of the alarm signal includes modifying a level of the alarm signal based on the velocity of the vehicle.

4. The method according to claim 1 wherein the generating of the alarm signal includes modifying a harmonic content of the alarm signal based on the velocity of the vehicle.

5. The method according to claim 1 further including wirelessly transmitting the modified alarm signal to a hearing protection device in a vicinity of the vehicle.

6. The method according to claim 1 further including communicating at least one of a visual alert or an auditory alert to an operator of the vehicle when the background noise level is greater than a threshold value.

7. The method according to claim 6 wherein the threshold value is based on a maximum sound pressure level capable of being emitted by a transducer configured to emit the alarm signal.

8. The method according to claim 7 where the threshold value is approximately 10 dB less than the maximum sound pressure level.

9. The method according to claim 1, further including determining a signal to noise ratio (SNR) between the alarm signal level and the measured background noise level, wherein the modifying of the generated alarm signal includes modifying the generated alarm signal based on the SNR.

10. The method according to claim 9, wherein the modifying of the generated alarm signal includes comparing the SNR to an SNR threshold, increasing a level of the generated alarm signal if the SNR is less than the SNR threshold and decreasing the level of the generated alarm signal if the SNR is greater than the SNR threshold.

11. The method according to claim 10, further including:
measuring a further alarm signal level of the emitted modified alarm signal;
comparing the further alarm signal level to a lower threshold value and an upper threshold value;
setting a level of the modified alarm signal to the lower threshold value if the further alarm signal level is less than the lower threshold value; and
setting the level of the modified alarm signal to the upper threshold value if the further alarm signal level is greater than the upper threshold value.

12. A method of modifying a back-up alarm signal of a vehicle comprising:
measuring at least one of a translational state and a rotational state of the vehicle;
modifying the back-up alarm signal emitted from the vehicle to contain information related to the at least one of the translational state and the rotational state, forming a modified back-up alarm signal; and
emitting the modified back-up alarm signal,
wherein the modifying of the back-up alarm signal includes:
recording a first signal from an ambient sound microphone to a first buffer when the modified back-up alarm signal is emitted,
converting the first signal stored in the first buffer to a first frequency domain signal and weighting the first frequency domain signal with a first frequency dependant weighting vector to form a first frequency weighted signal,
determining a first value, where the first value is at least one of a root mean square value, a mean-square value, and a sum of squares level value of the first frequency weighted signal, and converting the first value to a first decibel signal level to form an alarm signal level,
recording a second signal from the ambient sound microphone to a second buffer when the modified back-up alarm signal is not emitted,
converting the second signal stored in the second buffer to a second frequency domain signal and weighting the second frequency domain signal with a second frequency dependant weighting vector to form a second frequency weighted signal,
determining a second value, where the second value is at least one of a root mean square value, a mean-square value, and a sum of squares level value of the second frequency weighted signal, and converting the second value to a second decibel signal level to form a background noise level,
estimating a signal to noise ratio (SNR) by subtracting the alarm signal level from the background noise level,
comparing the estimated SNR to a SNR threshold value,
modifying a gain of the back-up alarm signal responsive to the estimated SNR to form a modified alarm signal level, where modifying of the gain includes one of increasing the gain of the back-up alarm signal if the estimated SNR is less than the SNR threshold value and decreasing the gain of the back-up alarm signal if the estimated SNR is greater than the SNR threshold value,
comparing the modified alarm signal level with a lower threshold value, and setting the modified alarm signal level to the lower threshold value if the modified alarm signal level is less than the lower threshold value,
comparing the modified alarm signal level with an upper threshold value, and setting the modified alarm signal level to the upper threshold value if the modified alarm signal level is greater than the upper threshold value, and
issuing at least one of an auditory and visual warning to the vehicle operator.

13. A system for modifying a back-up alarm signal of a vehicle comprising:
at least one loudspeaker configured to emit the back-up alarm signal;
at least one ambient sound microphone configured to measure a background noise level of a region in proximity to the vehicle when the back-up alarm signal is not generated and to measure an alarm signal level of the emitted back-up alarm signal and the background noise level;
an accelerometer configured to measure a velocity of the vehicle and to determine a direction of movement of the vehicle; and
a processor operatively connected to the at least one loudspeaker, the at least one ambient sound microphone and the accelerometer, where the processor is configured to modify the back-up alarm signal based on: 1) the velocity from the accelerometer and 2) the measured background noise level and the alarm signal level from the at least one microphone to generate a modified alarm signal, the loudspeaker configured to emit the modified alarm signal.

14. The system according to claim 13 wherein the processor is configured to modify a level of the back-up alarm signal based on the measured background noise level.

15. The system according to claim 14 wherein the level of the modified alarm signal is limited at or below a predetermined upper threshold.

16. The system according to claim 15 wherein the processor is configured to control production of at least one of a visual and audible warning to an operator of the vehicle when the level of the modified alarm signal is at the predetermined upper threshold.

17. The system according to claim 14 wherein the level of the modified alarm signal is limited at or above a predetermined lower threshold.

18. The system according to claim 13 wherein the processor is configured to modify a level of the back-up alarm signal corresponding to the velocity of the vehicle.

19. The system according to claim 13 wherein the processor is configured to modify a harmonic content of the back-up alarm signal corresponding to the velocity of the vehicle.

20. The system according to claim 13 wherein the at least one ambient sound microphone is less than about 10 centimeters from the at least one loudspeaker.

21. The system according to claim 13 further comprising a hearing protection device remote from the vehicle, wherein the processor is configured to wirelessly transmit the modified alarm signal to the hearing protection device.

22. A method of warning people in proximity to a vehicle comprising the steps of:
providing a periodic alarm signal comprising an off state where an alarm signal is not present and an on state where the alarm signal is present, the periodic alarm signal activated when the vehicle is moving in a reverse direction;
measuring a background noise level in proximity to the vehicle during the off state of the periodic alarm signal; and
measuring a sound pressure level of the alarm signal during the on state of the periodic alarm signal.

23. The method according to claim 22 further including a step of using a frequency weighting curve when measuring the background noise level.

24. The method as according to claim 22 further including a step of using a frequency weighting curve when measuring the sound pressure level of the alarm signal.

25. The method according to claim 22 further including a step of evaluating a system performance by comparing the measured sound pressure level of the alarm signal against a predicted sound pressure level.

26. The method according to claim 22 further including a step of increasing a level of the alarm signal in a next on state of the periodic alarm signal when a difference between the measured sound pressure level of the alarm signal and the background noise level is less than a predetermined value.

* * * * *